Figure 9:
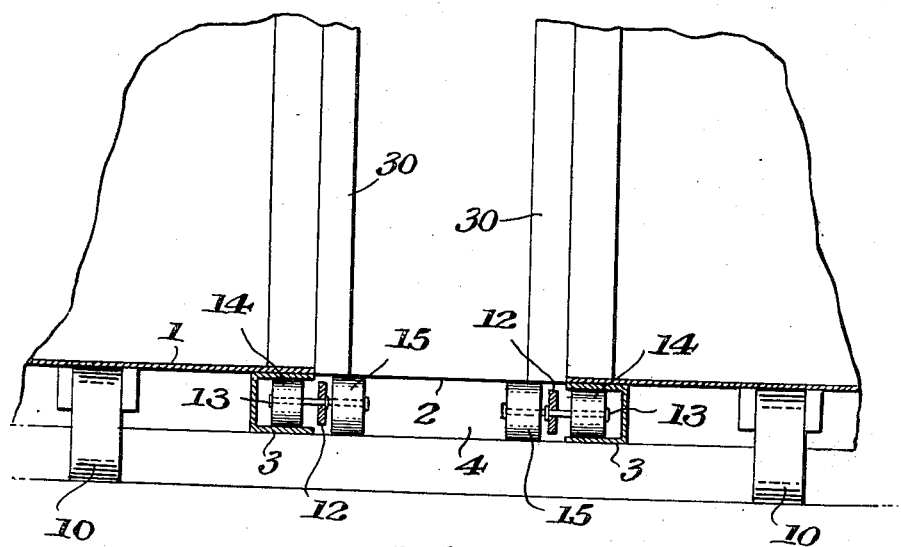

March 5, 1957 S. E. MARCUSSON 2,783,905
HAND TRUCK
Filed Dec. 8, 1954 4 Sheets-Sheet 1
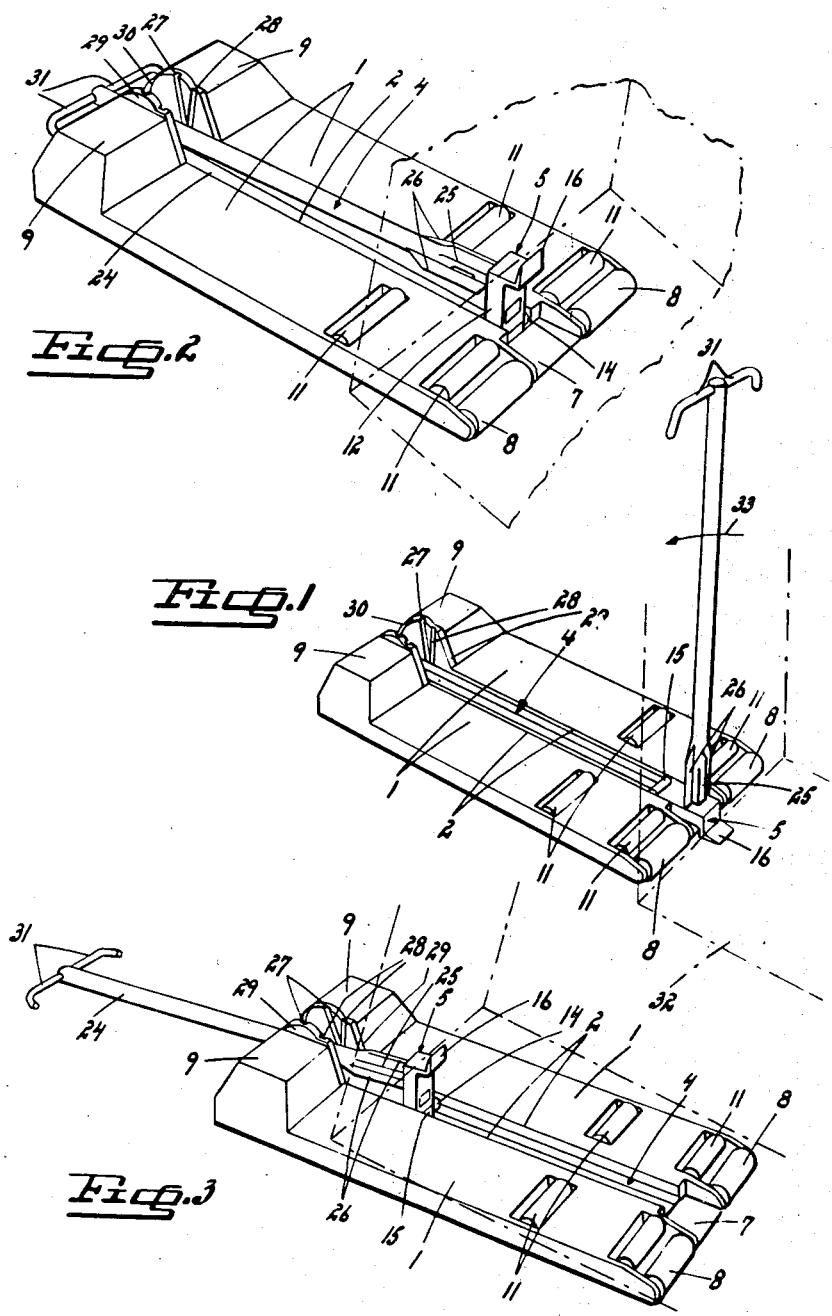
INVENTOR
SVEN ERIK MARCUSSON

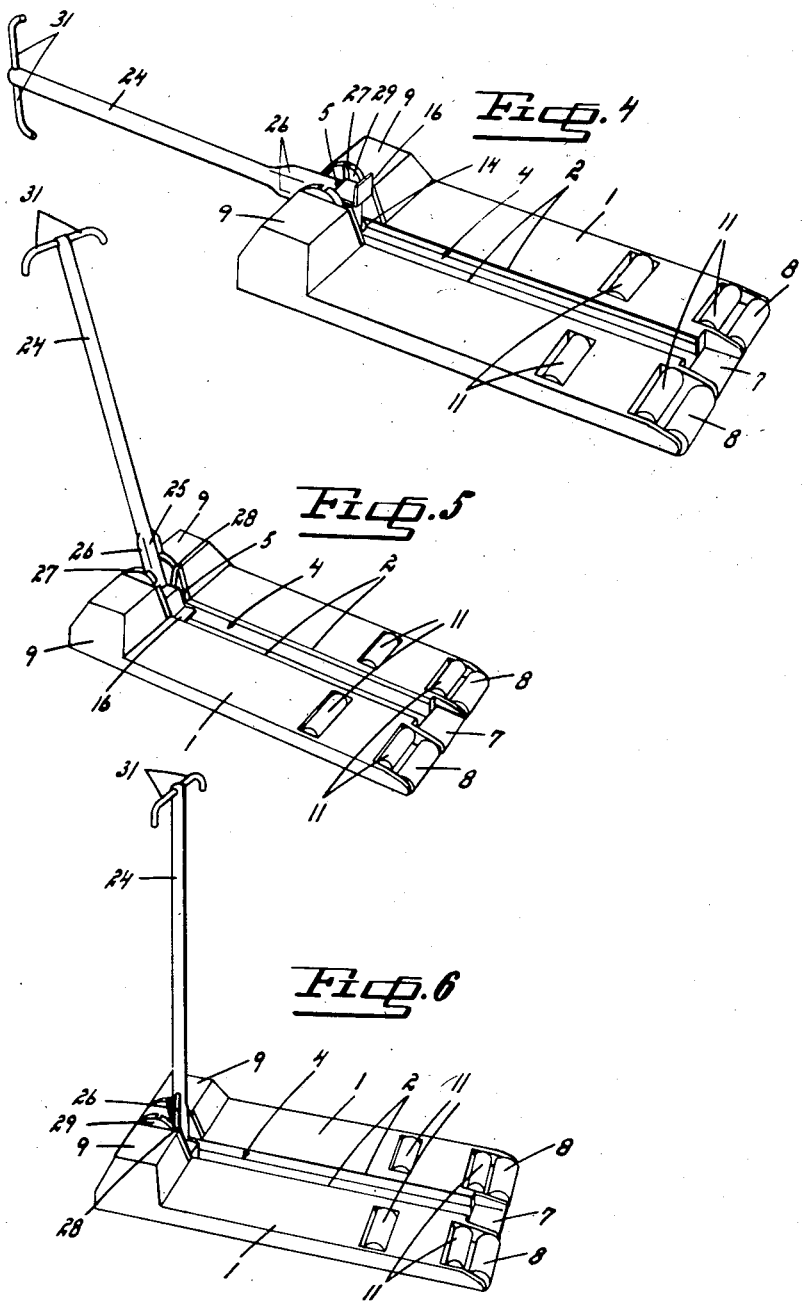

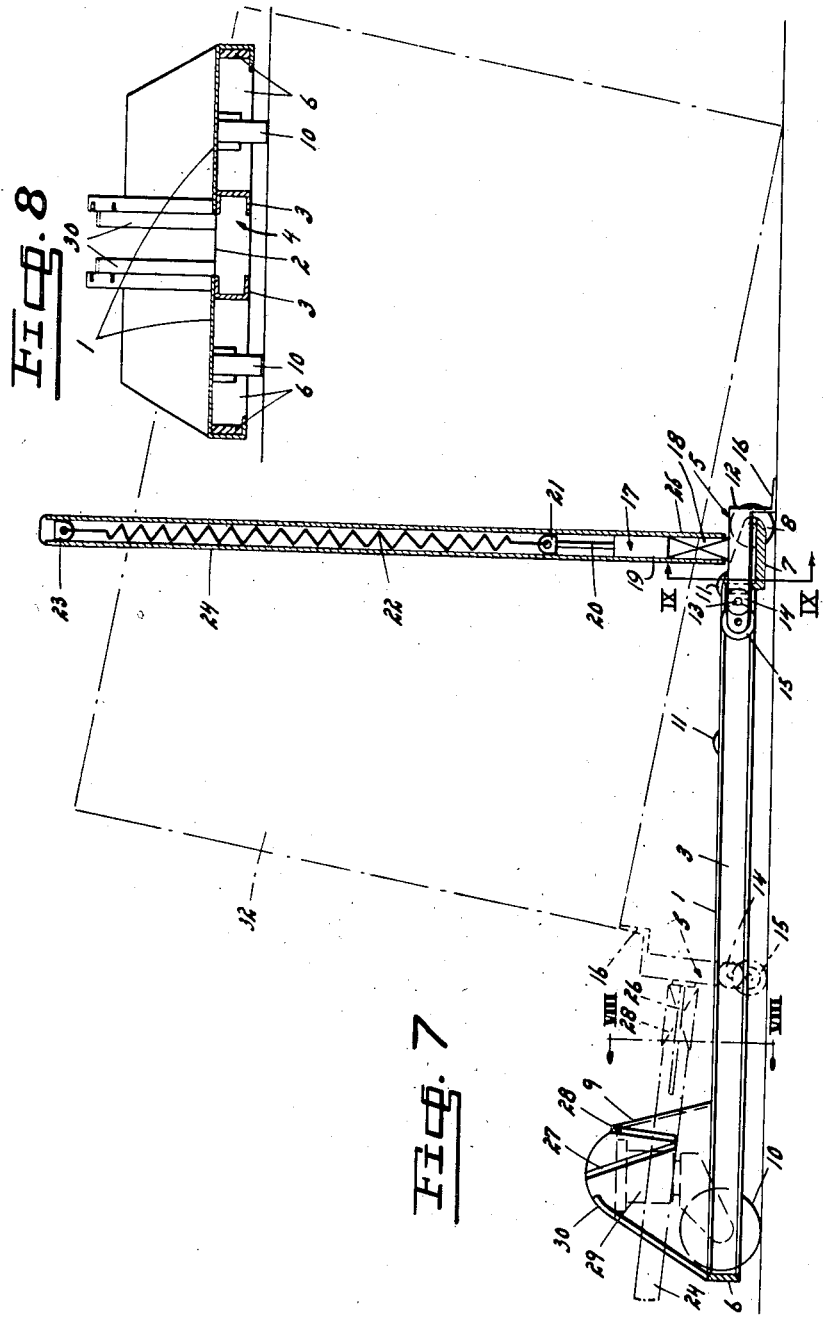

March 5, 1957  S. E. MARCUSSON  2,783,905
HAND TRUCK
Filed Dec. 8, 1954  4 Sheets-Sheet 4

SVEN E. MARCUSSON
INVENTOR.

BY Wenderoth, Lind & Ponack

ATTYS.

United States Patent Office 2,783,905
Patented Mar. 5, 1957

2,783,905

HAND TRUCK

Sven Erik Marcusson, Angelholm, Sweden, assignor to S. Marcusson Transportvagnfabrik A. B., Angelholm, Sweden, a corporation of Sweden Application December 8, 1954, Serial No. 473,947

6 Claims. (Cl. 214—350)

The present invention relates to a hand truck of the kind having a guide for a runner displaceable between two opposite sides of the truck and swingable in a vertical plane and which can be pushed beneath goods to be loaded on the hand truck in order to lift the goods at one side thereof while moving between two end positions, thus making it possible to push the truck beneath the goods while the truck is being moved with respect to the runner, said truck being essentially characterized by the feature that the runner is displaceably mounted in a slot located in the centre of the loading plane of the truck and extending from one to the other of two opposite sides, said slot being defined by two essentially U-shaped section irons disposed on both sides of the slot and with their open portions facing each other, said irons forming the guide for the runner, which enters the slot by means of wheels mounted at two opposite sides of the runner and is supported displaceably by the section irons. The hand truck according to the invention is easy to handle and very sturdy, and by means of the truck it is essentially easier to transfer goods to the truck and to deposit it therefrom than by means of trucks of this kind used so far.

For the better understanding of the invention a preferred embodiment thereof as applied to a hand truck will now be described with reference to the accompanying drawings.

Figure 10:
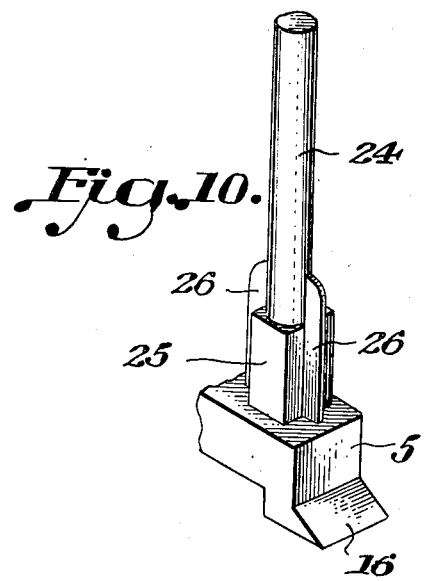

In the drawings,

Figs. 1 to 6 show perspective views of the hand truck in different positions while an object to be transported is being transferred to the truck, Fig. 7 is a longitudinal section through the hand truck, Fig. 8 is a section on line VIII—VIII of Fig. 7, Fig. 9 is an enlarged sectional view along line IX—IX of Fig. 7; and Fig. 10 is a perspective view of the runner 5 and the attachment of handle 24 thereto.

In the drawings, 1 designates the loading plane of the hand truck which is essentially formed by two pieces of sheet metal pressed in one piece and spaced from each other so as to form a slot 2 in the centre of the loading plane of the hand truck and extending from one to the other of two opposite sides. The longitudinal edges of the sheet metal pieces forming the sides of the truck are bent to rectangular shape in cross-section. On both sides of the slot 2 and with their flanges secured to the underside of the respective sheet metal pieces forming the loading plane 1 there are disposed two section irons 3 essentially U-shaped in cross-section and with their open portions facing each other, which irons form a guide generally designated 4 and intended for a runner 5. The sheet metal pieces forming the loading plane 1 are connected with each other at their sides located close to the short sides of the truck by means of a connecting piece 6 U-shaped in the horizontal plane of the loading plane 1 and by means of a connecting piece 7 located beneath the level of the loading plane, to which connecting pieces 6 and 7 the section irons 3 forming the guide 4 are also secured by means of their ends, whereby the loading plane 1 becomes very stable and is capable of supporting considerable stresses exerted by heavy goods. The loading plane 1 is supported by rollers 8 mounted therein and by wheels 10 swingably mounted in special housings 9 rising from the level of the loading plane, whereby the loading plane 1 rises only insignificantly above the support on which the goods rest, so that the loading plane can be pushed like a shovel beneath the goods to be carried by the truck. Slightly rising from the level of the loading plane there are two pairs of rollers 11 journalled in the loading plane in order to reduce the friction between the loading plane and the goods when these are transferred to the loading plane.

The runner 5 consists of a frame 12 made preferably of sheet metal. By means of wheels 14 disposed at two opposite sides of the runner and mounted on the free ends of a shaft 13 mounted in the frame 12 and projecting from the sides of the frame and disposed transversely of the truck, the runner both enters and is supported displaceably by the section irons 3, as seen in Fig. 9. On both sides of the shaft 13 there is mounted a roller 15 in the frame 12 and disposed a flange 16 projecting downwardly and from the side of the frame 12, the purpose of which means will be explained more in the following. From the side of the runner 5 which is normally located on a level with the loading plane there projects a pin 17 fixed in the frame 12 of the runner and whose portion 18 which is located closest to the frame 12 is cross-sectionally polygonal, whereas the subsequent portion 19 has a circular cross-section, whereupon follows a portion 20 turned to a smaller diameter and whose free end is provided with an attachment 21 for one end of a helical spring 22 whose other end is disposed in an attachment 23 provided on the free end of the draw- or pushbar 24 of the hand truck, which bar is shaped as a tube and forms a lever together with the runner. The spring 22 and the pin 17 are normally located in said bar. One end 25 of the draw- or pushbar 24 which encloses the lower portion of the pin 17 has a cross-sectional shape which corresponds to the polygonal portion 18 of the pin 17 as clearly seen in Fig. 10. The end 25 of the draw- or pushbar 24 is provided on the outside with two diametrically disposed coupling flanges 26 extending in the longitudinal direction of the bar and forming connecting means for connecting the draw- or pushbar 24 with the truck when the truck is to be moved. For the connection of the coupling flanges 26 and consequently of the draw- or pushbar 24 with the truck there are provided two members 29 on both sides of the slot 2 at one end thereof, which members 29 form a wall in the respective one of the housings 9 disposed on both sides of the guide 4 at one end thereof and define the slot 2 together with the section irons 3. The members 29 are provided with connecting means in the form of grooves 27 and 28. From the front edge of each of the members 29 there projects a guiding flange 30 into the slot 2. The purpose of these guiding flanges will be described more in detail in the following. The rollers 8 and the wheels supporting the truck are journalled in ball bearings in order that the truck may be moved with relatively great ease. At its free end the draw- or pushbar 24 is provided with two irons 31 projecting in opposite directions from its side and serving as handles, onto which there are passed sleeves of a material suitable for the hands.

When the truck is to be used and the goods, e. g. a crate, indicated in dot and dash lines in Fig. 1 and subsequent figures and designated 32 is to be lifted onto the truck in order to be carried to another place, the truck is moved up to the crate 32, as indicated in Fig. 1, and the flange 16 of the runner 5 is inserted between the crate and the support on which the crate rests due to the truck being pushed with a certain force, e. g. by means of a foot, on that side of the truck where the housings 9 are located. As appears from Fig. 1, the flange 16 obtains a safe support for transmitting the necessary force, at the part connecting the flange 16 with the frame 12 and extending at an angle to the flange through the connecting piece 7 resting against this part. When the flange 16 has been inserted beneath the crate 32, the draw- or pushbar 24 is actuated in the direction indicated by means of an arrow 33 in Fig. 1. The runner 5 is thereby actuated in such a way that it is tilted and is moved together with the draw- or pushbar 24 to the position shown in Fig. 2, whereby one side of the crate 32 is raised from the floor. When the runner 5 tilts, the roller 15 is moved to rest against the support, whereby the runner 5 alone carries that side of the crate 32 which is raised from the support so that the truck is totally unloaded and can be pushed without any difficulty whatever beneath the crate as far as necessary in order that the crate may rest completely on the truck after the runner 5 has been moved out of engagement therewith and thus be raised out of contact with the support. Also if the article to be lifted is provided with cross-pieces or the like on the outside, as will frequently occur on crates, the truck can be inserted beneath the crate without operation of the runner 5 since the crate is raised sufficiently. The runner 5 now occupies the position shown in Fig. 5, in which further displacement of the runner 5 is prevented because the coupling flanges 26 have come to rest against the housings 9. However, if the crate 32 should be so long that when the runner 5 is moved out of engagement therewith it does not tilt onto the loading plane 1 nor goes out of engagement with the support, the draw- or pushbar 24, after being displaced in its longitudinal direction against the action of the spring 22, and its polygonal end 25 has been moved out of engagement with the polygonal portion 18 on the pin 17 projecting into the drawbar, can be moved 90° about its longitudinal axis, whereby the connecting flanges 26 are moved to the position shown in Fig. 4, in which the end 25 on the draw- or pushbar has once more been moved into engagement with the portion 18 of the pin 17 through the action of the spring 22. Through the rotation of the draw- or pushbar 24 and the moving of the coupling flanges 26 to a vertical position the coupling flanges 26 do not prevent the runner 5 from being moved to the position shown in Fig. 4 for the transfer of goods of maximum size. From the position shown in Fig. 4 the draw- or pushbar 24 is swung upwards, whereby the runner is released from the crate or the like, which consequently tilts and goes out of engagement with the support and is deposited on and then rests completely on the loading plane 1. At the same time as the draw- or pushbar 24 is swung upwards, it is displaced against the action of the spring 22 in its longitudinal direction and is turned 90° about its longitudinal axis, as has been described already. During the swinging and the simultaneous rotation of the draw- or pushbar 24 about its longitudinal axis, it has been swung up to such a position that when the spring 22 is allowed to act on the draw- or pushbar 24 the latter is returned to the original position with respect to the pin 17, at the same time as the coupling flanges 26 are introduced into the grooves 27 located opposite each other in the members 29, whereby the draw- or pushbar 24 is connected obliquely forwardly and upwardly with the truck, in such a way that the latter on manual actuation of the bar 24 allows itself to be pushed and drawn, whereby the goods can be conveyed to the intended place. In that connection it happens rather often that the goods are to be transported from one story to another whereby a lift between the different stories is used. In such a case it is advantageous to let the goods remain on the truck, which is moved into and out of the lift. In many cases, however, the space in goods lifts is most restricted and at the same time it is desired to be able to brake the truck to prevent it from being displaced in the lift. For this purpose the draw- or pushbar 24 is actuated again after the truck has been introduced into the lift in its longitudinal direction, as has been described already, whereby the coupling flanges 26 are moved out of the grooves 27. This makes it possible to swing the draw- or pushbar to the position shown in Fig. 6, in which the coupling flanges due to the action of the spring 22 snap into the grooves arranged opposite each other in the members 29, whereby the draw- or pushbar 24 occupies a position at right angles to the loading plane. At the same time the flange 16 is moved to the position shown in Fig. 1 in contact with the floor of the lift, whereby the flange holds the truck fast so that it cannot be displaced. The draw- or pushbar swung to the last-mentioned position shown in Fig. 6 does not project from the side of the truck, whereby the truck occupies as small a space as possible.

At the displacement of the loading plane 1 with respect to the runner 5 from the position shown in Fig. 2 to the position shown in Figs. 3 or 4, the draw- or pushbar and consequently the runner 5 is guided by the coupling flanges 30 projecting from the members 29 into the slot 2, whereby there is no friction between the runner 5 and the guide 4 preventing or making difficult the displacement of the truck with respect to the runner 5.

At the removal of the goods from the truck after the transport the goods can be deposited simply by jerking the truck so that the goods will slide off therefrom, or else the working cycle described in the foregoing can be repeated in the inverse order.

The draw- or pushbar 24 can serve only as actuating means for the runner 5, whereas bars or the like intended for moving the truck can be fixedly connected e. g. with the housings 9 and/or adjacent parts of the loading plane 1.

Modifications are possible within the scope of the inventive idea as defined in the appendant claims.

What I claim and desire to secure by Letters Patent is:

1. In a hand truck having a guide extending across the loading plane and having a runner displaceable along the guide and swingable in a vertical plane with means thereon for insertion beneath goods to be loaded on the hand truck for lifting one side of the goods while the hand truck is moved relative to the runner, said guide being defined by two U-shaped members disposed on either side of a slot in the loading plane with the open portions thereof facing each other, and said runner having wheels on each side thereof running in said U-shaped members, that improvement comprising a bar for pushing or drawing the hand truck mounted on the runner for applying leverage thereto to lift goods to be loaded and having flanges projecting laterally of the bar adjacent the runner, the bar being movable longitudinally of its axis relative to the runner, and two members on the loading plane of the hand truck on either side of the guide formed by said U-shaped members and having a plurality of grooves in the surfaces thereof facing each other in which said flanges are engageable.

2. A hand truck as claimed in claim 1, wherein the grooves provided in the two members rising from the loading plane of the truck and defining the slot are arranged in pairs and disposed in the members to permit the bar to be connected with the truck in a position at right angles to the loading plane and in a position in which the bar projects obliquely forwardly and upwardly from the loading plane of the truck.

3. A hand truck as claimed in claim 1 in which the two members mounted on the loading plane of the truck comprise two housings, and wheels swingably mounted on said truck within said housings.

4. A hand truck as claimed in claim 1 in which the bar is connected to said runner for movement in the direction of its longitudinal axis and rotation about its longitudinal axis.

5. A hand truck as claimed in claim 4 in which said bar is a tube having a spring mounted therein under tension, and said runner has an upwardly directed pin projecting into said bar to which said spring is attached.

6. A hand truck as claimed in claim 4 in which said bar is shaped as a tube having a rectangular portion at the end thereof adjacent said runner, and said upwardly directed pin has a rectangular portion adjacent said runner corresponding in shape to the rectangular portion of said bar, said pin further having a cylindrical section thereon corresponding to the shape of said bar.

References Cited in the file of this patent

UNITED STATES PATENTS

| | | |
|---|---|---|
| 878,751 | Schreiber | Feb. 11, 1908 |
| 1,225,859 | Reed | May 15, 1917 |
| 1,924,885 | Schreck | Aug. 29, 1933 |
| 2,570,726 | Smith | Oct. 9, 1951 |

FOREIGN PATENTS

| | | |
|---|---|---|
| 607,732 | Great Britain | Sept. 3, 1948 |